(12) United States Patent
Glover

(10) Patent No.: US 7,305,848 B2
(45) Date of Patent: Dec. 11, 2007

(54) COOLING FAN APPARATUS

(76) Inventor: Seth T. Glover, 6529 Shady La. SE., #B, Lacey, WA (US) 98513

( * ) Notice: Subject to any disclaimer, the term of this patent is extended or adjusted under 35 U.S.C. 154(b) by 238 days.

(21) Appl. No.: 11/243,577

(22) Filed: Oct. 5, 2005

(65) Prior Publication Data

US 2006/0070396 A1    Apr. 6, 2006

Related U.S. Application Data

(60) Provisional application No. 60/615,693, filed on Oct. 5, 2004.

(51) Int. Cl.
*F25D 3/02* (2006.01)
(52) U.S. Cl. .............. 62/420; 62/425; 62/426
(58) Field of Classification Search .......... 62/420–427, 62/371, 404, 406, 430, 434, 459, 259.3
See application file for complete search history.

(56) References Cited

U.S. PATENT DOCUMENTS

| | | | | |
|---|---|---|---|---|
| 1,922,790 A | * | 8/1933 | Alger | 62/425 |
| 1,952,414 A | * | 3/1934 | Brizzolara | 62/93 |
| 2,133,818 A | * | 10/1938 | Hulse | 62/419 |
| 2,157,519 A | * | 5/1939 | Beeman | 261/140.1 |
| 2,841,964 A | * | 7/1958 | Anderson | 62/426 |
| 4,468,932 A | * | 9/1984 | Bullard | 62/421 |
| 4,612,774 A | | 9/1986 | Budreau | |
| 4,751,827 A | | 6/1988 | Villarreal | |
| 4,879,880 A | * | 11/1989 | Harrison | 62/406 |
| 5,159,819 A | | 11/1992 | Wong | |
| 5,685,165 A | | 11/1997 | Bigelow, Jr. | |
| 5,860,293 A | * | 1/1999 | Piro | 62/420 |
| 6,170,282 B1 | * | 1/2001 | Eddins | 62/259.3 |
| 6,192,702 B1 | * | 2/2001 | Shimogori | 62/259.3 |
| 6,336,341 B1 | * | 1/2002 | McGraw et al. | 62/420 |
| 6,357,251 B1 | * | 3/2002 | Marks | 62/425 |
| 6,401,483 B1 | | 6/2002 | Kopp | |
| 6,427,476 B1 | * | 8/2002 | Eddins | 62/457.2 |

\* cited by examiner

*Primary Examiner*—Mohammad M. Ali

(57) ABSTRACT

A cooling fan apparatus includes a main housing assembly which includes a front housing end, a rear housing end, and a plurality of housing air channels located at the rear housing end. A fan assembly is supported in the main housing assembly near the front housing end. A solid coolant retaining assembly, for retaining a block of water ice, is supported in the main housing assembly and is located between the fan assembly and the rear housing end. The solid coolant retaining assembly includes a plurality of retainer air channels, and an access door is connected to the main housing assembly for allowing access to the solid coolant retaining assembly through the main housing assembly. Preferably, the main housing assembly further includes housing air channels located on side portions of the main housing assembly. A drainage receptacle is connected to the solid coolant retaining assembly for receiving the liquid melt from the ice.

7 Claims, 3 Drawing Sheets

COOLING FAN APPARATUS

CROSS-REFERENCE TO RELATED APPLICATION

This application claims priority based upon my copending Provisional Application Ser. No. 60/615,693; filed Oct. 5, 2004.

BACKGROUND OF THE INVENTION

1. Field of the Invention

The present invention relates generally to cooling devices from room air, and, more particularly, to cooling devices for room air which employ an electric fan to circulate room air around a cold material in order to cool the room air.

2. Description of the Prior Art

It is well known that warm room air can be cooled when the warm room air is circulated to a cool material so that heat exchange will cause the warm air to be cooled. In this respect, throughout the years, a number of innovations have been developed relating to the use of electric fans to circulate warm room air to a cool material so that heat exchange will cause the warm air to be cooled, and the following U.S. patents are representative of some of those innovations: U.S. Pat. Nos. 4,612,774, 4,751,827, 5,159,819, 5,685,165, and 6,401,483.

More specifically, U.S. Pat. No. 4,612,774 discloses an ice cooled fan screen apparatus in which an ice-containing unit for an electric fan is placed in front of the fan. By placing the ice-containing unit in front of the fan, the pattern of air distribution from the fan is interfered with. To avoid this interference with air distribution from the fan, it would be desirable if a cooling fan apparatus were provided in which an ice-containing unit were located behind an electric fan. Furthermore, with this device, it appears that water from melted ice accumulates at the bottom of the ice-containing unit, and the entire ice-containing unit must be lifted up and tilted to spill the accumulated water out of the apparatus. Moreover, it appears that to empty the accumulated water out from the apparatus, either the ice-containing unit must first be separated from the fan in order to empty the water, or, without separating the ice-containing unit from the fan, then the combination of both the ice-containing unit and the fan must be lifted and tilted to spill the accumulated water out from the apparatus. To avoid the need for lifting up both an ice-containing unit and a fan in order to dispose of water accumulated from melting ice, it would be desirable if a container for water accumulated from melting ice could be easily separated from the fan unit so that the water can be easily disposed of.

U.S. Pat. No. 4,751,827 discloses a fan air cooler which includes a complex grid of spaced apart strips filled with a frozen fluid material. The grid is secured to the top edge of the fan housing. To avoid the effort and expense in creating and using such a complex grid of spaced apart strips filled a frozen fluid material, it would be desirable if a cooling fan apparatus were provided which does not employ a complex grid of spaced apart strips filled a frozen fluid material.

U.S. Pat. No. 5,159,819 discloses a palm sized air conditioner in which water from melted ice accumulates at the bottom of the device, and the entire device must be lifted up and tilted to spill the accumulated water out of the apparatus.

U.S. Pat. No. 5,685,165 discloses a portable air conditioner system that is mounted in a typical ice chest. With this device, water from melted ice accumulates at the bottom of the device, and the entire device must be lifted up and tilted to spill the accumulated water out of the apparatus.

U.S. Pat. No. 6,401,483 discloses a portable air conditioner which is another device in which water from melted ice accumulates at the bottom of the device, and the entire device must be lifted up and tilted to spill the accumulated water out of the apparatus.

As stated above, for a cooling fan apparatus that employs ice and an electric fan, it would be desirable if a container were provided for accumulating water from melting ice, and it would be further desirable if the container could be easily separated from the fan unit so that the water can be easily disposed of.

Still other features would be desirable in a cooling fan apparatus. For example, with the prior art devices discussed above, the devices appear to be supported on a floor at a low height with respect to the floor. As a result, air that is cooled will tend to stay near the floor. This may not be desirable because cool air naturally sinks in warmer air. Thus, it would be preferable if means were provided for causing cooled air to be circulated at a higher height with respect to the floor to permit the cooled air to cool warm air at a height substantially distant from the floor level.

With a number of the prior art devices discussed above, the devices employ pieces of ice that are relatively small in size. More specifically, conventional ice cubes are often employed. However, than only using conventional ice cubes, it would be desirable at times to employ a relatively large single block of ice. In this respect, it would be desirable if a cooling fan apparatus were provided that can employ a relatively large single block of ice.

Thus, while the foregoing body of prior art indicates it to be well known to use devices for cooling room air with an electric fan and pieces of ice, the prior art described above does not teach or suggest a cooling fan apparatus which has the following combination of desirable features: (1) has an ice-containing unit that is located behind an electric fan; (2) provides a container for water accumulated from melting ice that can be easily separated from the fan unit so that the water can be easily disposed of; (3) does not employ a complex grid of spaced apart strips filled a frozen fluid material; (4) causes cooled air to be circulated at a higher height with respect to the floor to permit the cooled air to cool warm air at a height substantially distant from the floor level; and (5) can employ a relatively large single block of ice as the cooling medium.

The foregoing desired characteristics are provided by the unique cooling fan apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a cooling fan apparatus which includes a main housing assembly which includes a front housing end, a rear housing end, and a plurality of housing air channels located at the rear housing end. A fan assembly is supported in the main housing assembly near the front housing end. A solid coolant retaining assembly supported in the main housing assembly and is located between the fan assembly and the rear housing end. The solid coolant retaining assembly includes a plurality of retainer air channels, and access means are connected to the main housing assembly for allowing access to the solid coolant retaining assembly through the main housing assembly. The cooling fan apparatus of the invention permits ambient air in a room to be both cooled and circulated in the room.

Preferably, the main housing assembly further includes housing air channels located on side portions of the main housing assembly. Also, preferably, the access means include an access door in the main housing assembly which is in registration with the solid coolant retaining assembly.

The fan assembly includes a fan motor supported by the main housing assembly and a fan blade connected to the fan motor. Preferably, a blade guard is connected to the front housing end, such that the fan blade is between the blade guard and the fan motor.

A quantity of solid coolant is retained in the solid coolant retaining assembly. The quantity of solid coolant can be a quantity of water ice.

Preferably, a drainage receptacle is connected to the solid coolant retaining assembly for receiving melted ice from the ice.

For a floor supported model of the cooling fan apparatus, a pedestal unit is connected to a bottom side of the main housing assembly. The pedestal unit provides that the apparatus is maintained at a significant height above floor level.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cooling fan apparatus which has all of the advantages of the prior art and none of the disadvantages.

It is another object of the present invention to provide a new and improved cooling fan apparatus which may be easily and efficiently manufactured and marketed.

It is a further object of the present invention to provide a new and improved cooling fan apparatus which is of durable and reliable construction.

An even further object of the present invention is to provide a new and improved cooling fan apparatus which is susceptible of a low cost of manufacture with regard to both materials and labor, and which accordingly is then susceptible of low prices of sale to the consuming public, thereby making such cooling fan apparatus available to the buying public.

Still yet a further object of the present invention is to provide a new and improved cooling fan apparatus which has an ice-containing unit that is located behind an electric fan.

Still another object of the present invention is to provide a new and improved cooling fan apparatus that provides a container for water accumulated from melting ice that can be easily separated from the fan unit so that the water can be easily disposed of.

Yet another object of the present invention is to provide a new and improved cooling fan apparatus which does not employ a complex grid of spaced apart strips filled a frozen fluid material.

Even another object of the present invention is to provide a new and improved cooling fan apparatus that causes cooled air to be circulated at a higher height with respect to the floor to permit the cooled air to cool warm air at a height substantially distant from the floor level.

Still a further object of the present invention is to provide a new and improved cooling fan apparatus which can employ a relatively large single block of ice as the cooling medium.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved cooling fan apparatus embodying the principles and concepts of the present invention will be described.

Figure 1:
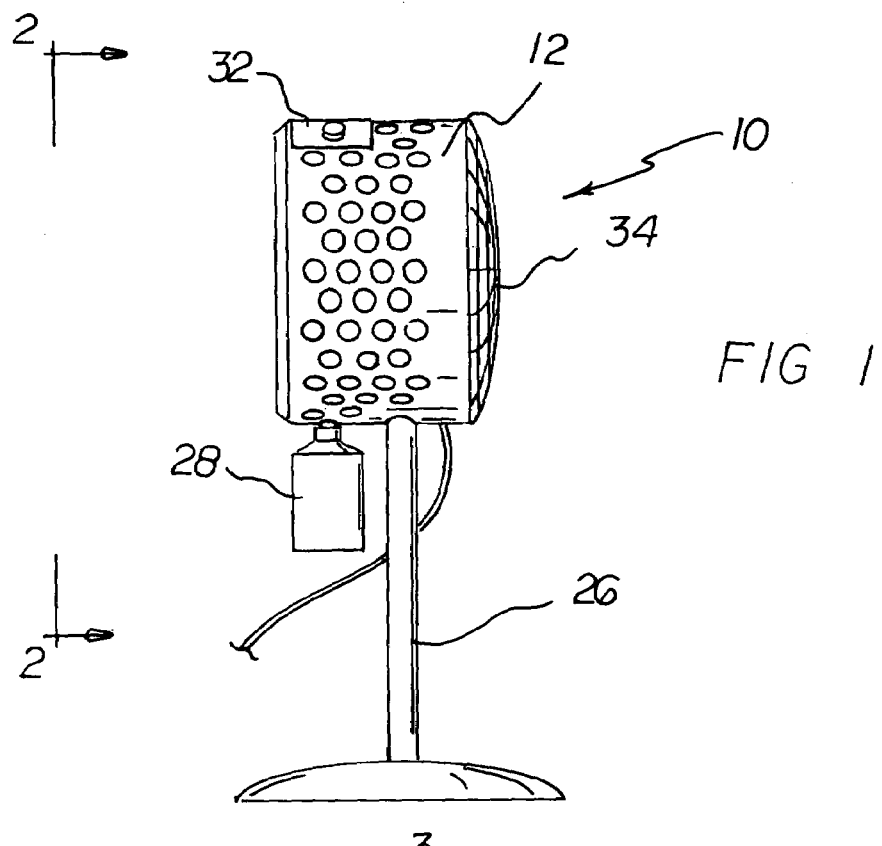
FIG. 1 is a side view showing a preferred embodiment of the cooling fan apparatus of the invention.
Figure 2:
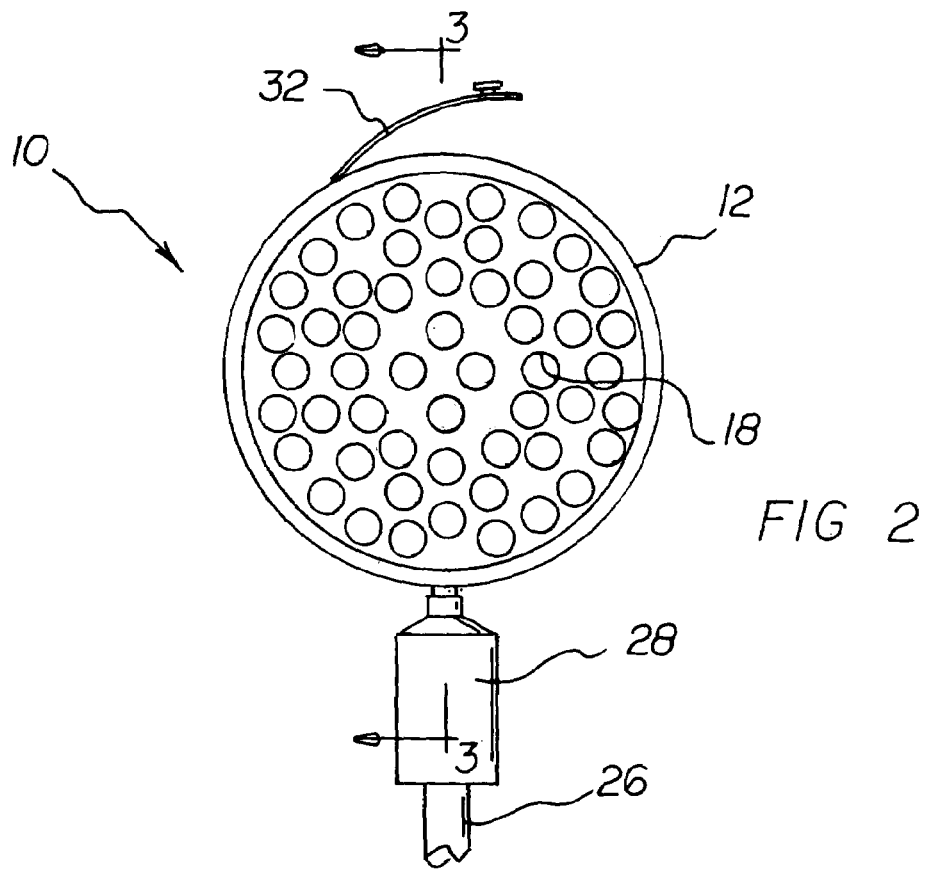
FIG. 2 is an enlarged partial rear view of the embodiment of the cooling fan apparatus shown in FIG. 1 taken along line 2-2 of FIG. 1.
Figure 3:
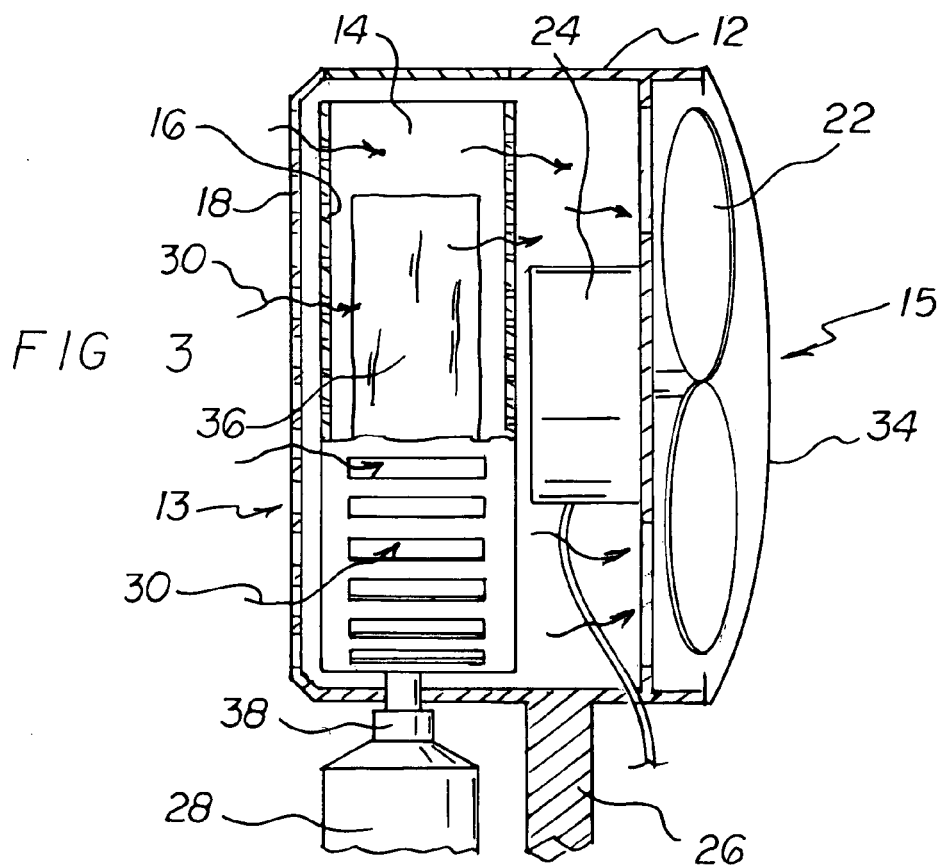
FIG. 3 is a cross-sectional view of the embodiment of the cooling fan apparatus of FIG. 2 taken along line 3-3 thereof.
Figure 4:
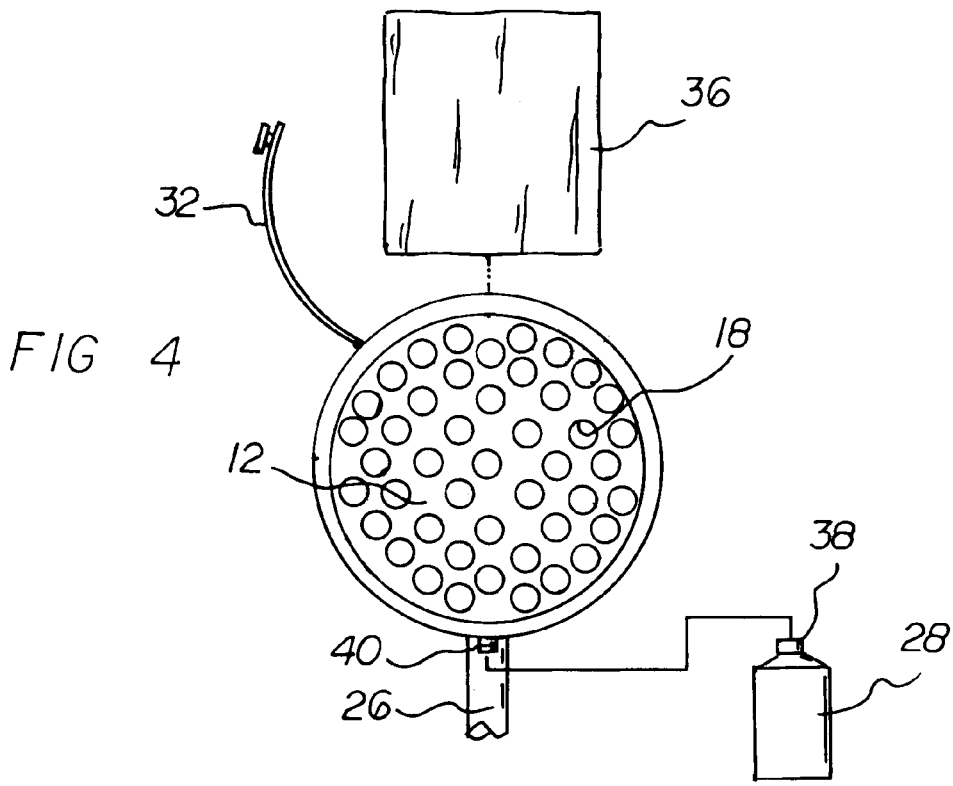
FIG. 4 is a rear view of the embodiment of the invention shown in FIG. 2 wherein a solid coolant is being placed in the apparatus through an open access door.
Figure 5:
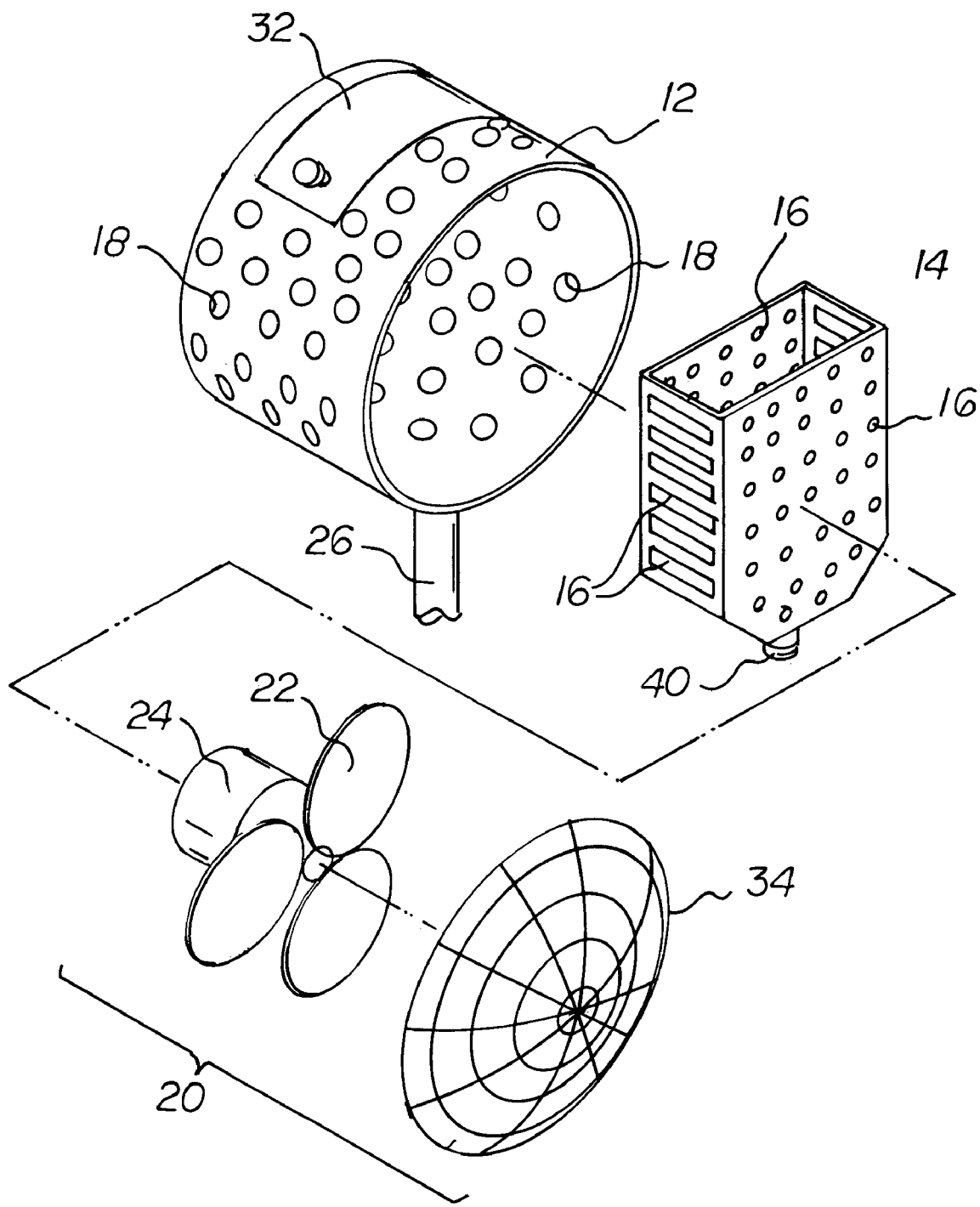
FIG. 5 is an exploded perspective view of the embodiment of the invention shown in FIGS. 1-4.

Turning to FIGS. 1-5, is shown a preferred embodiment of the cooling fan apparatus of the invention generally designated by reference numeral 10. In the preferred embodiment, cooling fan apparatus 10 includes a main housing assembly 12 which includes a front housing end 15, a rear housing end 13, and a plurality of housing air channels 18 located at the rear housing end 13. A fan assembly 20 is supported in the main housing assembly 12 near the front housing end 15. A solid coolant retaining assembly 14 supported in the main housing assembly 12 and is located between the fan assembly 20 and the rear housing end 13. The solid coolant retaining assembly 14 includes a plurality of retainer air channels 16, and access means are connected to the main housing assembly 12 for allowing access to the solid coolant retaining assembly 14 through the main housing assembly 12.

Preferably, the main housing assembly 12 further includes housing air channels 18 located on side portions of the main housing assembly 12. Also, preferably, the access means include an access door 32 in the main housing assembly 12 which is in registration with the solid coolant retaining assembly 14.

The fan assembly 20 includes a fan motor 24 supported by the main housing assembly 12 and a fan blade 22 connected to the fan motor 24. Preferably, a blade guard 34 is connected to the front housing end 15, such that the fan blade 22 is between the blade guard 34 and the fan motor 24.

A quantity of solid coolant 36 is retained in the solid coolant retaining assembly 14. The quantity of solid coolant 36 can be a quantity of water ice 36.

Preferably, a drainage receptacle 28 is connected to the solid coolant retaining assembly 14 for receiving melted ice from the ice 36. The drainage receptacle 28 can include a threaded portion 38 that connects to a complementarily threaded portion 40 on the bottom of the solid coolant retaining assembly 14.

For a floor supported model of the cooling fan apparatus 10, a pedestal unit 26 is connected to a bottom side of the main housing assembly 12. The pedestal unit 26 permits the main housing assembly 12 and the contents therein to be supported at an elevated position above the floor.

To operate the cooling fan apparatus 10, the access door 32 is lifted, and a block of ice 36 is loaded into the solid coolant retaining assembly 14. Then the access door 32 is closed. As the block of ice 36 melts, liquid water drains into the drainage receptacle 28. The size of the drainage receptacle 28 is sufficient so that when the block of ice 36 is fully melted, substantially all of the melt liquid is retained in the drainage receptacle 28.

After the block of ice 36 has been placed in the solid coolant retaining assembly 14, the fan assembly 20 can be turned on. When this occurs, ambient air is drawn, as shown by directional arrows 30 in FIG. 3, through the rear and side housing air channels 18 and into the main housing assembly 12.

The drawn-in ambient air is further drawn through the retainer air channels 16 located at the read of the solid coolant retaining assembly 14 and into the interior of the solid coolant retaining assembly 14 where the ambient air is cooled by the block of ice 36 in the solid coolant retaining assembly 14. As the ambient air is cooled by the block of ice 36, heat is transferred from the ambient air to the block of ice 36, causing the block of ice 36 to melt. Liquid melt flows out the bottom of the solid coolant retaining assembly 14 and into the attached drainage receptacle 28.

The cooled air is drawn out from retainer air channels 16 located in the front of the solid coolant retaining assembly 14 and is finally pushed out through the blade guard 34 and into the room, thereby cooling the air in the room.

After the block of ice 36 has fully melted, the drainage receptacle 28 is unscrewed from the solid coolant retaining assembly 14, emptied, and reattached to the solid coolant retaining assembly 14. The drainage receptacle 28 can be removed from the solid coolant retaining assembly 14, emptied, and reattached to the solid coolant retaining assembly 14 without lifting or tilting the apparatus.

As an alternative to the use of a block of ice 36. A sealed container containing a quantity of cooled or frozen so-called "blue ice" can be placed in the solid coolant retaining assembly 14. If this is done, only a minimal amount of condensate from the ambient air would drain into the drainage receptacle 28.

The components of the cooling fan apparatus of the invention can be made from inexpensive and durable metal and plastic materials.

In each of the figures, reference numerals are shown that correspond to like reference numerals that designate like elements shown in other figures.

The components of the cooling fan apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved cooling fan apparatus that is low in cost, relatively simple in design and operation, and which may advantageously employ an ice-containing unit that is located behind an electric fan. With the invention, a cooling fan apparatus provides a container for water accumulated from melting ice that can be easily separated from the fan unit so that the water can be easily disposed of. With the invention, a cooling fan apparatus is provided which does not employ a complex grid of spaced apart strips filled a frozen fluid material. With the invention, a cooling fan apparatus is provided which causes cooled air to be circulated at a higher height with respect to the floor to permit the cooled air to cool warm air at a height substantially distant from the floor level. With the invention, a cooling fan apparatus is provided which can employ a relatively large single block of ice as the cooling medium.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A cooling fan apparatus, comprising:
   a main housing assembly which includes a front housing end, a rear housing end, and a plurality of housing air channels located at said rear housing end,
   a fan assembly supported in said main housing assembly near said front housing end,
   a solid coolant retaining assembly supported in said main housing assembly and located between said fan assembly and said rear housing end, wherein said solid coolant retaining assembly includes a plurality of retainer air channels,
   access means connected to said main housing assembly for allowing access to said solid coolant retaining assembly through said main housing assembly,
   a drainage receptacle connected to said solid coolant retaining assembly for receiving melted coolant, and
   a pedestal unit connected to a bottom side of said main housing assembly.

2. The apparatus of claim 1 wherein said main housing assembly further includes housing air channels located on side portions of said main housing assembly.

3. The apparatus of claim 1 wherein said access means include an access door in said main housing assembly which is registration with said solid coolant retaining assembly.

4. The apparatus of claim 1 wherein said fan assembly includes a fan motor supported by said main housing assembly and a fan blade connected to said fan motor.

5. The apparatus of claim 4, further including:
   a blade guard connected to said front housing end, such that said fan blade is between said blade guard and said fan motor.

6. The apparatus of claim 1, further including:
   a quantity of solid coolant retained in said solid coolant retaining assembly.

7. The apparatus of claim 1 wherein said quantity of solid coolant is a quantity of solid ice.

* * * * *